UNITED STATES PATENT OFFICE.

JOHN D. WILLIAMS, OF ALLEGHENY, PENNSYLVANIA.

IMPROVEMENT IN THE MANUFACTURE OF IRON.

Specification forming part of Letters Patent No. 51,771, dated December 26, 1865; antedated December 14, 1865.

*To all whom it may concern:*

Be it known that I, JOHN D. WILLIAMS, of the city and county of Allegheny, in the State of Pennsylvania, have invented certain new and useful Improvements in the Process of Manufacturing Iron; and I do hereby declare that the following is a full and exact description thereof.

To enable others skilled in the art to make iron by the use of my invention, I will proceed to describe it and its operation.

The nature of my invention consists in mixing with melted iron, in an ordinary puddling-furnace, a solution or compound composed of sulphuric acid, water, salt, lime, and potash, said iron, furnace, and compound being manipulated and operated in the manner hereinafter described.

I use the ordinary boiling or puddling furnace with all the usual appendages thereof, taking care, however, to have the depth from the bottom to the "fore-plate" to be about ten inches. I prepare the furnace with "fix" (black ore) and place in it the usual charge of iron, which is about four hundred and eighty (480) pounds avoirdupois. I heat the furnace and melt the iron in the usual manner. After the iron is melted down I then throw in on the melted iron in a gradual manner the compound; but before I commence to mix the compound with the melted pig-iron I lower the damper of the chimney of the furnace. I stir the mixture well in with the iron, mixing, stirring, and manipulating them well for about fifteen minutes. I then raise the damper and boil or puddle "hot" until the iron commences to sink. I then lower the damper within a few "links" of being closed down, and keep it in this position until the iron is ready. I then draw it off and work it in the usual manner. I then charge up the furnace again, and proceed in the manner above described.

The solution or compound which I use is composed of the chemical ingredients named and mixed in quantities and order about as follows: one pound of sulphuric acid diluted with one quart of clean soft water, to which is added one pound of potash, one pound of salt, and a half-pound of good slaked lime. These ingredients are all mixed well together, and the whole gradually mixed and stirred well with the charge of melted iron, consisting of about four hundred and eighty pounds. Now, in using this compound or solution, commonly called "physic," I wish it to be clearly understood that the manner of controlling the action of the furnace by raising and lowering the chimney-damper is all-important with the use, as described, of the chemical compound, and without the combined action of the damper on the furnace and the physic on the melted iron the work will be imperfect.

Having thus described my improvement, what I claim as of my invention is—

The process herein described for puddling or boiling iron, which process consists in pouring in on melted iron an acid or saline solution, prepared substantially as described, the melted iron and furnace being manipulated in the manner herein described, and for the purpose set forth.

JOHN D. WILLIAMS.

Witnesses:
JAMES J. JOHNSTON,
ALEXANDER HAYS.